(12) United States Patent
Jin

(10) Patent No.: US 8,391,640 B1
(45) Date of Patent: Mar. 5, 2013

(54) METHOD AND APPARATUS FOR ALIGNING AND UNWARPING DISTORTED IMAGES

(75) Inventor: Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1223 days.

(21) Appl. No.: 12/201,822

(22) Filed: Aug. 29, 2008

(51) Int. Cl.
*G06K 9/36* (2006.01)
(52) U.S. Cl. ........................... 382/284; 382/294
(58) Field of Classification Search .................. 382/284, 382/294
See application file for complete search history.

(56) References Cited

U.S. PATENT DOCUMENTS

| | | | |
|---|---|---|---|
| 6,198,852 B1 * | 3/2001 | Anandan et al. | 382/284 |
| 6,323,934 B1 | 11/2001 | Enomoto | |
| 6,389,181 B2 | 5/2002 | Shaffer et al. | |
| 6,434,272 B1 | 8/2002 | Saarelma | |
| 6,788,333 B1 * | 9/2004 | Uyttendaele et al. | 348/36 |
| 6,791,616 B2 | 9/2004 | Tamaki et al. | |
| 6,977,679 B2 | 12/2005 | Tretter et al. | |
| 7,006,707 B2 * | 2/2006 | Peterson | 382/285 |
| 7,034,880 B1 | 4/2006 | Endsley et al. | |
| 7,065,255 B2 | 6/2006 | Chen et al. | |
| 7,075,985 B2 | 7/2006 | Lee | |
| 7,095,905 B1 * | 8/2006 | Peterson | 382/284 |
| 7,327,390 B2 * | 2/2008 | Gallagher | 348/224.1 |
| 7,424,170 B2 | 9/2008 | Steinberg et al. | |
| 7,612,804 B1 | 11/2009 | Marcu et al. | |
| 7,822,292 B2 * | 10/2010 | Jin | 382/296 |
| 8,023,772 B2 * | 9/2011 | Jin | 382/296 |
| 8,073,259 B1 * | 12/2011 | Jin | 382/190 |
| 2002/0029277 A1 | 3/2002 | Simpson-Young et al. | |
| 2002/0054224 A1 | 5/2002 | Wasula et al. | |
| 2002/0054241 A1 | 5/2002 | Compton | |
| 2002/0118890 A1 * | 8/2002 | Rondinelli | 382/276 |
| 2002/0146232 A1 | 10/2002 | Harradine et al. | |
| 2002/0154812 A1 * | 10/2002 | Chen et al. | 382/154 |
| 2002/0181802 A1 * | 12/2002 | Peterson | 382/284 |
| 2003/0063816 A1 * | 4/2003 | Chen et al. | 382/284 |
| 2003/0152283 A1 | 8/2003 | Moriwaki | |
| 2003/0206182 A1 | 11/2003 | Kelly et al. | |
| 2004/0095470 A1 | 5/2004 | Tecu et al. | |
| 2004/0150726 A1 | 8/2004 | Gallagher | |
| 2004/0174434 A1 | 9/2004 | Walker et al. | |
| 2004/0223063 A1 | 11/2004 | DeLuca et al. | |
| 2004/0233274 A1 * | 11/2004 | Uyttendaele et al. | 348/36 |

(Continued)

OTHER PUBLICATIONS

Jin, H. 2008. A Three-point Minimal Solution for Panoramic Stitchin with Lens Distortion. In CVPR 2008: IEEE Computer Society conference on Computer Vision and Pattern Recognition.*

(Continued)

*Primary Examiner* — Matthew Bella
*Assistant Examiner* — Gandhi Thirugnanam
(74) *Attorney, Agent, or Firm* — Robert C. Kowert; Meyertons, Hood, Kivlin, Kowert & Goetzel, P.C.

(57) ABSTRACT

A method and apparatus for aligning and unwarping distorted images in which an initial unwarping function is applied to the coordinates of feature points of a set of input component images to generate substantially rectilinear feature points. The substantially rectilinear feature points are then used to estimate focal lengths, centers, and relative rotations for pairs of the input images. A global nonlinear optimization is applied to the initial unwarping function(s) and the relative rotations to generate optimized unwarping functions and rotations for the component images. The optimized unwarping functions and rotations may then be used to render a panoramic image, generally in the form of a spherical projection, from the input component images.

30 Claims, 9 Drawing Sheets

U.S. PATENT DOCUMENTS

| | | | |
|---|---|---|---|
| 2005/0041103 A1 | 2/2005 | Kingo | |
| 2005/0063608 A1* | 3/2005 | Clarke et al. | 382/284 |
| 2005/0068452 A1 | 3/2005 | Steinberg et al. | |
| 2005/0286767 A1* | 12/2005 | Hager et al. | 382/190 |
| 2006/0072176 A1* | 4/2006 | Silverstein et al. | 358/540 |
| 2006/0093212 A1 | 5/2006 | Steinberg et al. | |
| 2006/0139474 A1 | 6/2006 | Endsley et al. | |
| 2006/0195475 A1 | 8/2006 | Logan et al. | |
| 2006/0291747 A1* | 12/2006 | Peterson | 382/284 |
| 2007/0031062 A1* | 2/2007 | Pal et al. | 382/284 |
| 2007/0071317 A1* | 3/2007 | Kubo et al. | 382/167 |
| 2007/0189333 A1 | 8/2007 | Naaman et al. | |
| 2007/0268411 A1 | 11/2007 | Rehm et al. | |
| 2007/0282907 A1 | 12/2007 | Chambers | |
| 2008/0088728 A1 | 4/2008 | Omaki et al. | |
| 2008/0101713 A1* | 5/2008 | Edgar | 382/260 |
| 2008/0104404 A1 | 5/2008 | Mergen et al. | |
| 2008/0106614 A1 | 5/2008 | Okuda et al. | |
| 2008/0112621 A1 | 5/2008 | Gallagher et al. | |
| 2008/0198219 A1 | 8/2008 | Yoshida et al. | |
| 2008/0285835 A1 | 11/2008 | Holland et al. | |
| 2009/0022421 A1 | 1/2009 | Uyttendaele et al. | |
| 2009/0083282 A1 | 3/2009 | Benitez et al. | |
| 2009/0092340 A1* | 4/2009 | Arguelles | 382/306 |

OTHER PUBLICATIONS

Brown, R. I. Hartley, and D. Nister. Minimal solutions for panoramic stitching. In Proc. of IEEE Conf. on Computer Vision and Pattern Recognition, 2007.*

H. S. Sawhney and R. Kumar. True multi-image alignment and its application to mosaicing and lens distortion correction. IEEE Trans. on Pattern Analysis and Machine Intelligence, 21(3):235-243, Mar. 1999.*

U.S. Appl. No. 12/251,261, filed Oct. 14, 2008, Adobe Systems Incorporated, all pages.

U.S. Appl. No. 12/251,253, filed Oct. 14, 2008, Adobe Systems Incorporated, all pages.

U.S. Appl. No. 12/251,258, filed Oct. 14, 2008, Adobe Systems Incorporated, all pages.

U.S. Appl. No. 12/251,267, filed Oct. 14, 2008, Adobe Systems Incorporated, all pages.

Kinghorn, Jay; Metadata: "Today's Workflow, Tomorrow's Automation?", Professional Digital Workflow Tech Brief, 2007.

Goldman, D.B.; Chen, Jiun-Hung; "Vignette and Exposure Calibration and Compensation," Tenth IEEE International Conference on Computer Vision, 2005, Publication Date: Oct. 17-21, 2005, vol. 1, on pp. 899-906.

"Exchangeable image file format for digital still cameras," Exif Version 2.2, Technical Standardization Committee on AV & IT Storage Systems and Equipment, Japan Electronics and Information Technology Industries Association, Apr. 2002.

DxO Optics Pro v5—A Review and Tutorial (Feb. 2008).

Jan Kybic , Philippe Thevenaz, Arto Nirkko and Michael Unser, "Unwarping of Unidirectionally Distorted EPI Images", IEEE Transactions on Medical Imaging, vol. 19, Issue 2, pp. 80-93, Feb. 2000.

Rohlfing et al., "Unwarping Confocal Microscopy Images of Bee Brains by Nonrigid Registration to a Magnetic Resonance Microscopy Image", Journal of Biomedical Optics, vol. 10(2), Mar./Apr. 2005.

Web site stitcher.realviz.com from May 29, 2008 via the Wayback machine at http://web.archive.org/ : http://web.archive.org/web/*/stitcher.realviz.com.

Review of Realviz Stitcher 5 by Jeff Mottle—CGarchitect.com http://www.cgarchitect.com/news/Reviews/Review046_1.asp (Jan. 13, 2006 date via Wayback machine at http://web.archive.org/).

Realviz Stitcher 5.1 Released, by Dr. Karl Harrison (Dec. 3, 2006) http://www.chem.ox.ac.uk/oxfordtour/tutorial/index.asp?ID=17&pagename=Realviz%20Stitcher%205.1.

Software Review: RealViz Stitcher 5.6 Panorama Maker, by David FitzSimmons, Feb. 2008 http://web4.popphoto.com/photosoftware/5138/software-review-realviz-stitcher-56-panorama-maker.html.

Photoshop CS3 Features http://www.photoshopcafe.com/cs3/CS3.htm, Feb. 2010.

Auto Align Layers and Auto Blend Layers (tutorial for Photoshop CS3 Auto Align)—Colin Smith—photoshopCAFE http://www.photoshopcafe.com/cs3/smith-aa.htm, Feb. 2010.

U.S. Appl. No. 12/201,824, filed Aug. 29, 2008, Entitled: "Metadata-Driven Method and Apparatus for Automatically Aligning Distorted Images" First Named Inventor: Hailin Jin.

Web site http://epaperpress.com/ptlens/ from Jun. 19, 2008 via the Wayback machine at http://web.archive.org/ : http://web.archive.org/web/20080619120828/http://epaperpress.com/ptlens/.

Office Action from U.S. Appl. No. 12/201,824, mailed Apr. 29, 2011, Adobe Systems Incorporated, all pages.

Office Action from U.S. Appl. No. 12/201,824, mailed Oct. 20, 2011, Adobe Systems Incorporated, all pages.

Office Action from U.S. Appl. No. 12/251,258, mailed Oct. 19, 2011, Adobe Systems Incorporated, all pages.

Office Action from U.S. Appl. No. 12/251,261, mailed Jan. 17, 2012, Adobe Systems Incorporated, all pages.

Office Action from U.S. Appl. No. 12/251,253, mailed Jun. 4, 2012, 61 pages.

Office Action from U.S. Appl. No. 12/251,267, mailed Aug. 15, 2012, 26 pages.

* cited by examiner

```
<rdf:li rdf:parseType="Resource">
    <stCamera:Make>{MANUFACTURER}</stCamera:Make>
    <stCamera:LensPrettyName>{LENS NAME} 8mm f/3.5</stCamera:LensPrettyName>
    <stCamera:Lens>8.0 mm f/3.5</stCamera:Lens>
    <stCamera:LensInfo>80/10 80/10 35/10 35/10</stCamera:LensInfo>
    <stCamera:FishEyeLens>True</stCamera:FishEyeLens>
    <stCamera:FishEyeModelParams>
    <rdf:Seq>
        <rdf:li>7.21</rdf:li>
        <rdf:li>-17.13</rdf:li>
        <rdf:li>9.18</rdf:li>
        <rdf:li>-33.27</rdf:li>
        <rdf:li>977.565</rdf:li>
    </rdf:Seq>
</stCamera:FishEyeModelParams>
```

*Figure 7*

METHOD AND APPARATUS FOR ALIGNING AND UNWARPING DISTORTED IMAGES

BACKGROUND

Description of the Related Art

Image capture devices, such as cameras, may be used to capture an image of a section of a view or scene, such as a section of the front of a house. The section of the view or scene whose image is captured by a camera is known as the field of view of the camera. Adjusting a lens associated with a camera may increase the field of view. However, there is a limit beyond which the field of view of the camera cannot be increased without compromising the quality, or "resolution", of the captured image. Further, some scenes or views may be too large to capture as one image with a given camera at any setting. Thus, it is sometimes necessary to capture an image of a view that is larger than can be captured within the field of view of a camera. In these instances, multiple overlapping images of segments of the view or scene may be taken, and then these component images may be joined together, or merged, to form a composite image.

One type of composite image is known as a panoramic image. A panoramic image may have a rightmost and leftmost image that each overlap only one other image, or alternatively the images may complete 360°, where all images overlap at least two other images. In the simplest type of panoramic image, there is one row of images, with each image at most overlapping two other images. However, more complex composite images may be captured that have two or more rows of images; in these composite images, each image may potentially overlap more than two other images. For example, a motorized camera may be configured to scan a scene according to an M×N grid, capturing an image at each position in the grid. Other geometries of composite images may be captured.

Computer programs and algorithms exist for assembling a single composite image from multiple potentially overlapping component images. A general paradigm for automatic image stitching techniques is to first detect features in individual images; second, to establish feature correspondences and geometric relationships between pairs of images (pair-wise stage); and third, to use the feature correspondences and geometric relationships between pairs of images found at the pair-wise stage to infer the geometric relationship among all the images (multi-image stage).

Panoramic image stitching is thus a technique to combine and create images with large field of views. Feature-based image stitching techniques are image stitching techniques that use point-correspondences, instead of image pixels directly, to estimate the geometric transformations between images. An alternative to feature-based image stitching techniques is intensity-based stitching techniques that use image pixels to infer the geometric transformations. Many image stitching implementations make assumptions that images are related either by 2D projective transformations or 3D rotations. However, there are other types of deformations in images that are not captured by the aforementioned two, for instance, lens distortions.

Panoramic image alignment is the problem of computing geometric relationships among a set of component images for the purpose of stitching the component images into a composite image. Feature-based techniques have been shown to be capable of handling large scene motions without initialization. Most feature-based methods are typically done in two stages: pair-wise alignment and multi-image alignment. The pair-wise stage starts from feature (point) correspondences, which are obtained through a separate feature extraction and feature matching process or stage, and returns an estimate of the alignment parameters and a set of point-correspondences that are consistent with the parameters. Various robust estimators or hypothesis testing frameworks may be used to handle outliers in point-correspondences.

The multi-image stage may use various techniques to further refine the alignment parameters, jointly over all the images, based on the consistent point-correspondences retained in the pair-wise stage. It is known that the convergence of the multi-image stage depends on how good the initial guesses are. However, an equally important fact that is often overlooked is that the quality of the final result from the multi-image stage depends on the number of consistent point-correspondences retained in the pair-wise stage. When the number of consistent point-correspondences is low, the multi-image alignment will still succeed, but the quality of the final result may be poor.

In the pair-wise stage, it is commonly assumed that an imaging system satisfies an ideal pinhole model. As a result, many conventional methods only estimate either 3×3 homographies or "rotation+focal lengths". However, real imaging systems have some amount of lens distortion. Moreover, wide-angle and "fisheye" lenses that are commonly used for shooting panoramic images tend to introduce larger distortions than regular lenses. Modeling lens distortion is critical for obtaining high-quality image alignment.

Radially symmetric distortion, or simply radial distortion, is a particular type of image distortion that may be seen in captured images, for example as a result of the optical characteristics of lenses in conventional film and digital cameras. In addition to radial distortion being introduced into images by lenses during image capture, radial distortion may be applied as an effect to either natural images (images of the "real world" captured with a conventional or digital camera) or synthetic images (e.g., computer-generated, or digitally synthesized, images). Radial distortion may be classified into two types: barrel distortion and pincushion distortion. FIG. 1A illustrates barrel distortion, and FIG. 1B illustrates pincushion distortion. Note that barrel distortion is typically associated with wide-angle and fisheye lenses, and pincushion distortion is typically associated with long-range or telescopic lenses.

In digital image processing, an unwarping process renders an image with little or no radial distortion from an image with radial distortion. FIG. 2A illustrates an unwarping process 202 rendering an image with little or no distortion 200B from an input image with barrel distortion 200A. FIG. 2B illustrates an unwarping process 202 rendering an image with little or no distortion 200D from an input image with pincushion distortion 200C. Note that the images in FIGS. 2A and 2B may be images digitized from photographs or negatives captured with a conventional camera, images captured with a digital camera, digitally synthesized images, composite images from two or more sources, or in general images from any source.

Conventionally, in digital image processing, unwarping 202 of radially distorted images has been performed using a two-dimensional (2-D) sampling process. For example, in a conventional unwarping process, a grid may be set in the output image (the image without radial distortion). For each point in the grid, a corresponding location is found in the input image (the image with radial distortion) by applying a distortion equation. Since this location may not have integral coordinates, 2-D interpolation may be used to obtain the color/intensity value for the corresponding pixel.

As mentioned above, panoramic image alignment is the process of computing geometric relationships among a set of component images for the purpose of stitching the component images into a composite image. A problem in panoramic image stitching is how to register or align images with excessive distortion, such as images taken with wide-angle or fisheye lenses. Because of the large amount distortion, conventional alignment workflows, including those modeling lens distortion, do not work well on such images. Another problem is how to efficiently unwarp the distorted images so that they can be stitched together to form a new image, such as a panorama.

A conventional method for aligning and unwarping images with excessive distortion is to unwarp the images with a pre-determined function onto a flat plane and then register the unwarped rectilinear version of the image using regular plane-projection based alignment algorithms. There are problems with this approach. For example, for images with a large amount of distortion such as images captured with fisheye lenses, the unwarped images tend to be excessively large. In addition, for images captured with some fisheye lenses, it is not even possible to unwarp an entire image to a flat plane because the field-of-view is larger than 180 degrees, and thus some sacrifices may have to be made.

As another example of problems with conventional methods for aligning and unwarping images with excessive distortion, the pre-determined unwarping functions may only do a visually acceptable job for unwarping images. Visually, the unwarped images may appear rectilinear. However, the images may not in fact be 100% rectilinear. The reason is that the pre-determined unwarping functions are conventionally obtained based on some standard configurations and are not adapted to the particular combination of camera and lens used to capture the image. Thus, conventional unwarping functions are not exact, and thus may introduce error in alignment and stitching.

Furthermore, rectilinear images generated by conventional unwarping algorithms may suffer from aliasing. Aliasing refers to a distortion or artifact that is caused by a signal being sampled and reconstructed as an alias of the original signal. An example of image aliasing is the Moiré pattern that may be observed in a poorly pixelized image of a brick wall. Conventional unwarping algorithms, which perform interpolation in 2-D space, may by so doing introduce aliasing artifacts into the output images. The aliasing artifacts may be another source of error in alignment and stitching.

In addition to the above, conventional unwarping algorithms are not very efficient. The distortion equation has to be solved for each point in the image. In addition, interpolation is done in two-dimensional (2-D) space, which is inefficient when sophisticated interpolation algorithms such as cubic interpolation are used.

Another conventional method for aligning and unwarping images with excessive distortion is to compute the unwarping function and alignment model all in the one step. This may yield better results. However, a problem with this method is that it is hard to optimize both the unwarping function and the alignment model because of the excessive distortion in images. There also may need to be a custom version of the code for each different combination of an unwarping function and an alignment model.

SUMMARY

Various embodiments of methods and apparatus for aligning and unwarping distorted images are described. Embodiments may provide a computer-implemented multi-stage image alignment and unwarping method that may, for example, be applied to sets of input images, which may be referred to herein as component images, that include relatively large amounts of distortion in each image, such as images captured using a camera with a wide-angle or fisheye lens, in a computer-automated image stitching process.

A method for aligning and unwarping distorted images is described in which an initial unwarping function is applied to the coordinates of feature points of a set of input component images to generate a set of unwarped, substantially rectilinear, feature points. The substantially rectilinear feature points are then used to estimate focal lengths, centers, and relative rotations for pairs of the input images. A global nonlinear optimization is applied to the initial unwarping function(s) and the relative rotations to generate optimized unwarping functions and rotations for the component images. The optimized unwarping functions and rotations may then be used to render a panoramic image, generally in the form of a spherical projection, from the input component images. This method does not require a processing- and memory-intensive intermediate step in which the component distorted images are unwarped into an intermediate, very large rectilinear image, as is found in conventional methods.

A feature extraction and feature matching technique may be performed on the component images to generate the set of feature points for the images. Such a technique may first detect features in individual images, and then establishes feature correspondences between overlapping pairs of the images. Each feature point corresponds to one feature correspondence from among the established feature correspondences for all of the images, and each feature point includes a set of coordinates established via the feature matching process. The unwarped set of feature points are referred to as substantially rectilinear feature points because the original coordinates of the feature points may be unwarped to generate coordinates that are nearly or approximately rectilinear, but may not be exactly rectilinear. A reason for the unwarped feature points being termed substantially but not exactly rectilinear is that an initial unwarping function for a particular type (e.g., make and model) of lens may be generated from calibration values obtained by calibrating a particular instance of that type of lens. However, the component images from which the feature points are extracted may have been captured with a different instance of that type of lens. Thus, the unwarped coordinates of feature points captured with a particular lens may be approximately, or substantially, rectilinear within a range of variation for that type of lens.

In one embodiment, an unwarping function or functions may be obtained as initial unwarping function(s). In one embodiment, metadata from the component images may be used to determine a lens profile or profiles that may be used to determine initial unwarping function(s). A feature extraction and feature matching technique may be performed on each overlapping pair of the component images to generate a set of feature points for each component image. Instead of initially unwarping the component images to generate a very large rectilinear image, embodiments apply the initial unwarping function(s) to the coordinates of the feature points to generate unwarped, substantially rectilinear feature point coordinates. Pair-wise processing is then performed using the substantially rectilinear feature points to estimate initial camera rotations, focal lengths, image centers, and possibly other information for the images. The initial unwarping function(s) may be refined for each image using the estimated focal length and center. A global optimization of the camera rotations and refined unwarping functions is then performed to generate optimized rotations and optimized unwarping functions. The optimized rotations and optimized unwarping functions may then be input to an alignment, unwarping and stitching process that applies the optimized rotations and optimized unwarping functions to the component images in aligning, unwarping and stitching the images. A panoramic image may thus be generated as output from the input set of distorted component images. Generally, the output panoramic image may be a spherical projection of the input images; however, other projections, such as cylindrical projections, may also be generated.

Embodiments may be implemented as or in a tool, module, library function, plug-in, stand-alone application, etc. For simplicity, implementations of embodiments of the method for aligning and unwarping distorted images may be referred to as an image alignment and unwarping module.

BRIEF DESCRIPTION OF THE DRAWINGS

FIG. 7 shows an exemplary camera/lens profile for a single camera/lens, according to one embodiment.

Figure 1A:
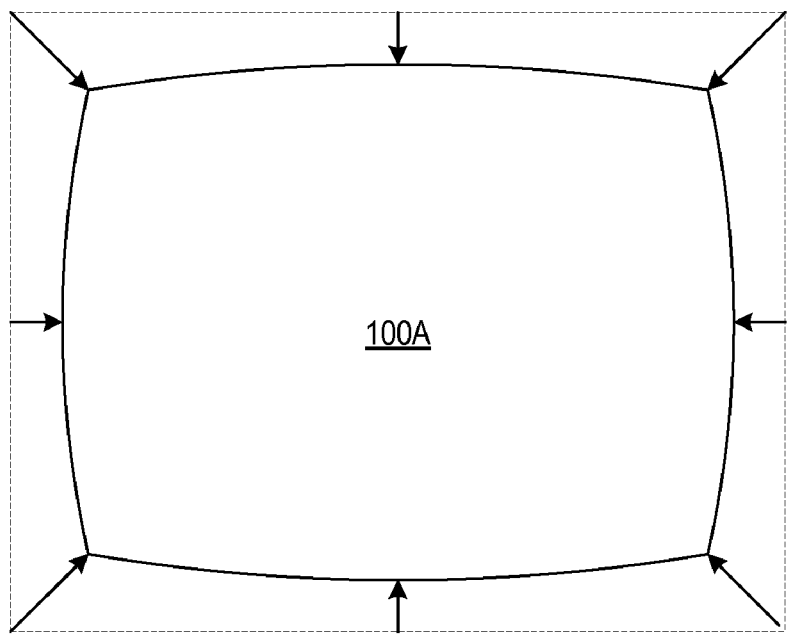
FIGS. 1A and 1B illustrate barrel distortion and pincushion distortion, respectively.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of methods and apparatus for aligning and unwarping distorted images are described. Embodiments may provide a computer-implemented multi-stage image alignment and unwarping method that may, for example, be applied to sets of input images, which may be referred to herein as component images, that include relatively large amounts of distortion in each image, such as images captured using a camera with a wide-angle or fisheye lens, in a computer-automated image stitching process.

A method for aligning and unwarping distorted images is described in which an initial unwarping function(s) is applied to the coordinates of feature points of a set of input component images to generate a set of unwarped, substantially rectilinear, feature points. Implementations of the method may be referred to herein as an image alignment and unwarping module. The substantially rectilinear feature points are then used to estimate focal lengths, centers, and relative rotations for pairs of the input images. A global nonlinear optimization is applied to the initial unwarping function(s) and the relative rotations to generate an optimized unwarping functions and rotations for the component images. The optimized unwarping functions and rotations may then be used to render a panoramic image, generally in the form of a spherical projection, from the input component images. This method does not require a processing- and memory-intensive intermediate step in which the component distorted images are unwarped into an intermediate, very large rectilinear image, as is found in conventional methods.

In addition, a metadata-driven, automated method for aligning and unwarping distorted images is described in which lens profiles for a variety of lens and camera combinations may be precomputed and stored. Metadata commonly stored with digital images may be used to automatically determine if a set of component images from which a panoramic image is to be generated include an excessive amount of distortion, and if so the metadata may be used to determine an appropriate lens profile and unwarping function for an automated aligning and unwarping process.

The above-described methods may be combined in embodiments of an automated method for aligning and unwarping distorted images in an automated image stitching process.

Methods and Apparatus for Aligning and Unwarping Distorted Images

Embodiments of a method for aligning and unwarping distorted images are described. Embodiments may provide a method for registering (aligning) images with excessive distortion, such as images taken with fisheye lenses. Because of the large distortion, conventional alignment workflows, including those modeling lens distortion, do not work well on this type of images. Embodiments may also efficiently unwarp distorted images so that they can be stitched together to form a new image, such as a panorama.

In embodiments of the method for aligning and unwarping distorted images, an unwarping function or functions may be obtained as initial unwarping function(s) in the image alignment and unwarping process. In one embodiment, metadata from the component images may be used to determine a lens profile or profiles that may be used to determine initial unwarping function(s) to be used in an image alignment and unwarping process. A feature extraction and feature matching technique may be performed on each overlapping pair of the component images to generate a set of feature points for the images. In one embodiment, the feature extraction and feature matching first detects features in individual images, and then establishes feature correspondences between overlapping pairs of the images. Each feature point corresponds to one feature correspondence from among the established feature correspondences for all of the images, and each feature point includes a set of coordinates established via the feature matching process. Instead of initially unwarping the component images to generate a very large rectilinear image, embodiments apply the initial unwarping function(s) to the coordinates of the feature points to generate unwarped, substantially rectilinear feature point coordinates. Pair-wise processing is performed using the substantially rectilinear feature points to estimate initial camera rotations, focal lengths, image centers, and possibly other information for the images. The initial unwarping function(s) may be refined for each image using the estimated focal length and center. A global optimization of the camera rotations and refined unwarping functions may then be performed to generate optimized rotations and optimized unwarping functions. The optimized rotations and optimized unwarping functions may then be input to an alignment, unwarping and stitching process that applies the optimized rotations and optimized unwarping functions to the component images to align, unwarp and stitch the component images.

The unwarped set of feature points are referred to as substantially rectilinear feature points because the original coordinates of the feature points may be unwarped to generate coordinates that are nearly or approximately rectilinear, but may not be exactly rectilinear. A reason for the unwarped feature points being termed substantially but not exactly rectilinear is that an initial unwarping function for a particular type (e.g., make and model) of lens may be generated from calibration values obtained by calibrating a particular instance of that type of lens. However, the component images from which the feature points are extracted may have been captured with a different instance of that type of lens. Generally, lens manufacturers produce particular models of lenses with physical and optical attributes that vary within ranges of tolerance. These ranges tend to be very small, especially for high-quality lenses. Therefore, there may be small variations between lenses of the same make and model, variations within the range of the manufacturers' tolerances for that type of lens. Thus, while the initial unwarping function used may be very close to the true unwarping function for the actual lens used to capture the component images, the initial unwarping function may actually differ from the true unwarping function for the actual lens in accordance with the range of variation for that type of lens. Thus, the unwarped coordinates of feature points captured with a particular lens may be approximately, or substantially, rectilinear within a range of variation for that type of lens. In addition, environmental and other factors, such as temperature and humidity, may effect camera lenses and cameras in general, and thus some, generally small, variations in distortion may be introduced in captured images, even using the same lens, under different conditions.

Embodiments of the method for aligning and unwarping distorted images may generate, as output, a panoramic image from the input set of distorted component images. Generally, the output panoramic image may be a spherical projection of the input images; however, other projections, such as cylindrical projections, may also be generated.

Embodiments of the method for aligning and unwarping distorted images may be implemented as or in a tool, module, library function, plug-in, stand-alone application, etc. For simplicity, implementations of embodiments of the method for aligning and unwarping distorted images may be referred to herein as an image alignment and unwarping module.

Figure 1B:
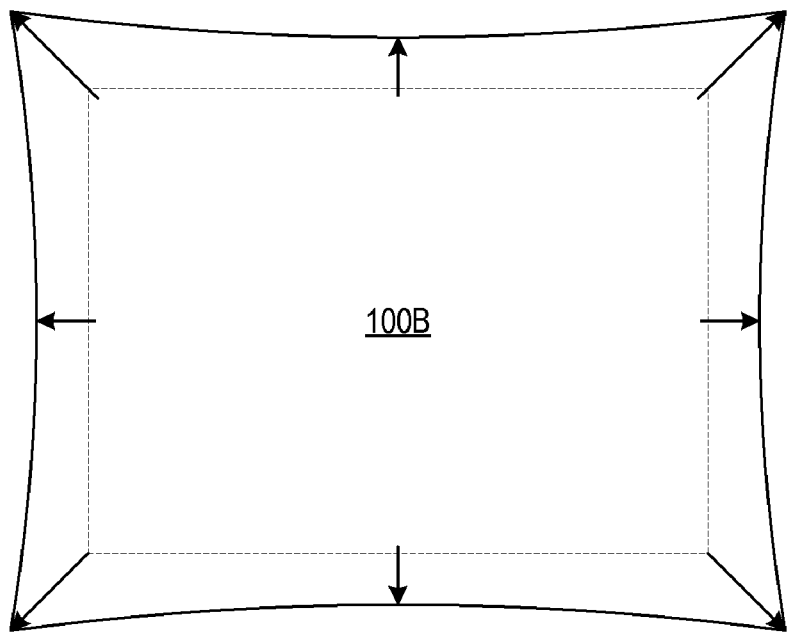
Figure 2A:
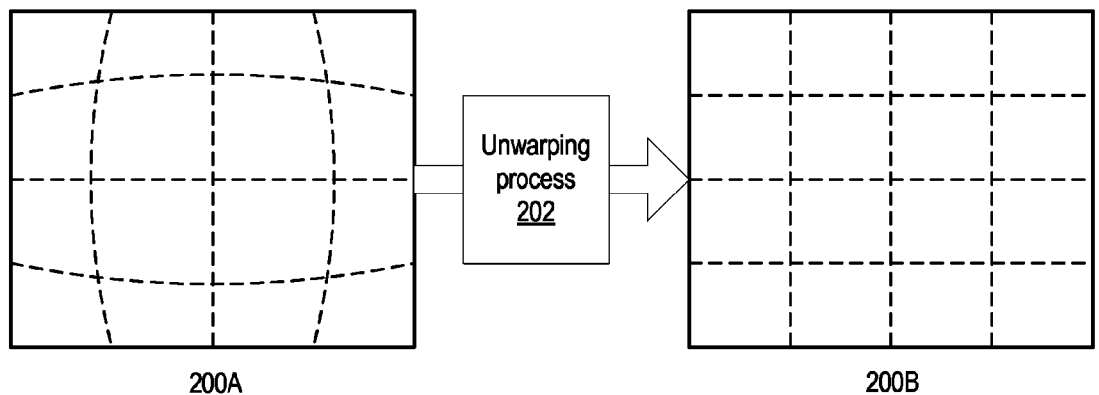
FIGS. 2A and 2B illustrate an unwarping process for barrel distortion and pincushion distortion, respectively.
Figure 2B:
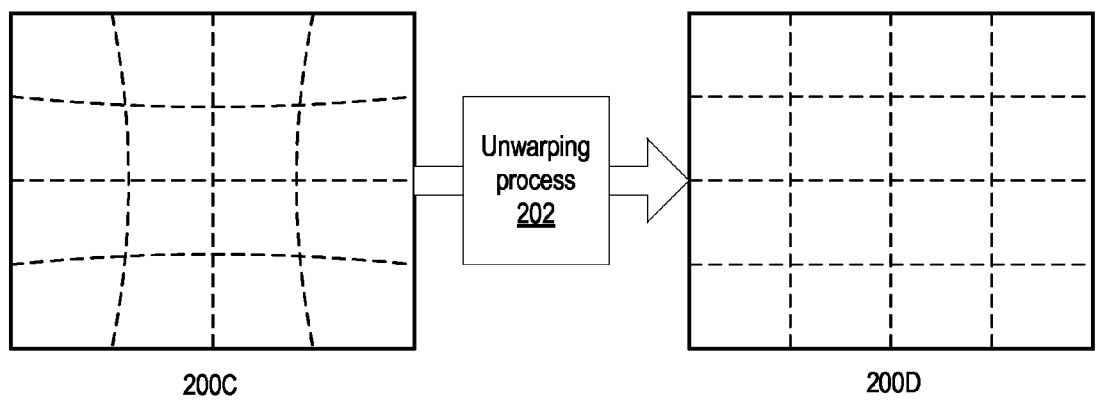

Embodiments are generally described for application to the alignment and unwarping of images captured with lenses that introduce a large amount of pincushion distortion to the images (see element 100B of FIG. 1B and element 200C of FIG. 2B), for example images captured using what are commonly referred to as fisheye lenses. However, embodiments may also be applied to the alignment and unwarping of images with less pincushion distortion than is produced with fisheye lenses, e.g. to images with some pincushion distortion captured using standard or wide-angle lenses. In addition, embodiments may be adapted to align and unwarp images with other types of distortion, such as images with barrel distortion (see element 100A of FIG. 1A and element 200A of FIG. 2A).

Figure 3:
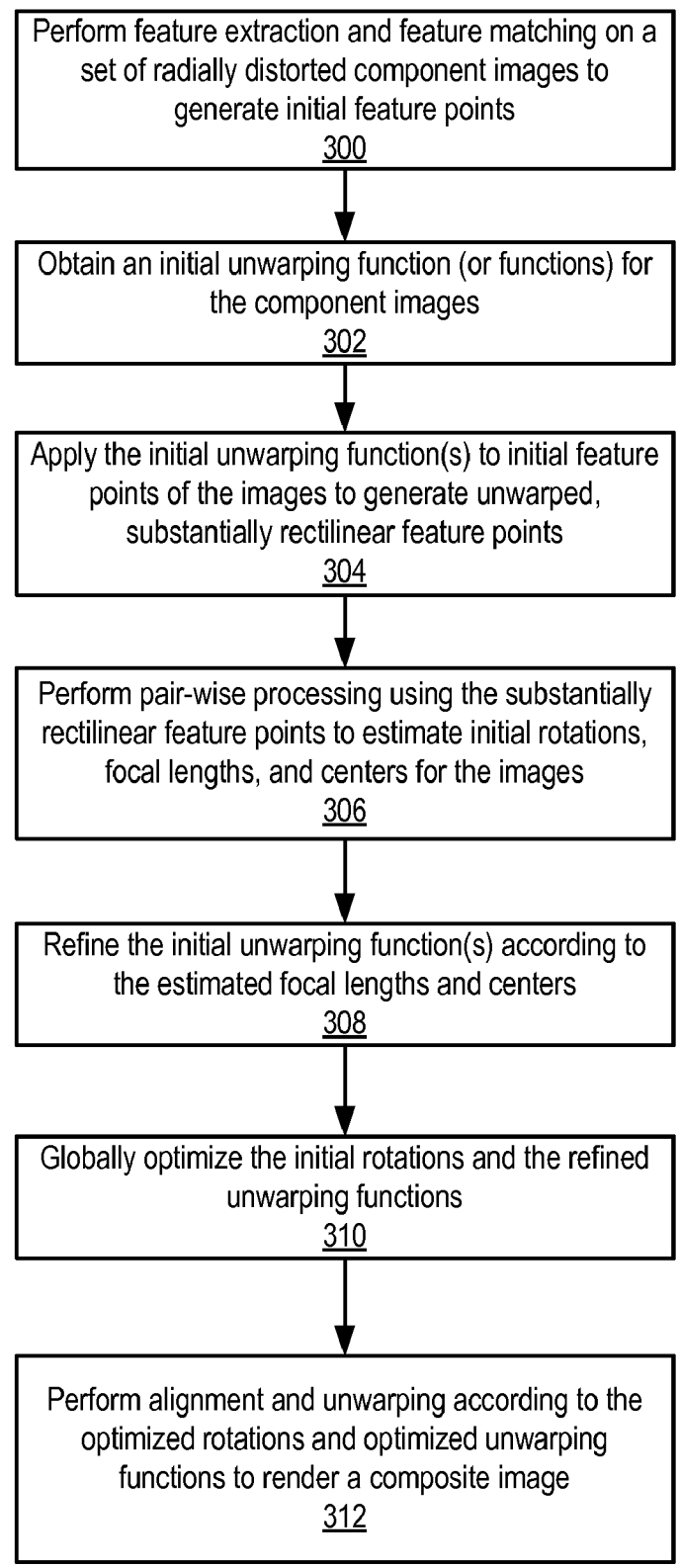
FIG. 3 is a flowchart of a method for aligning and unwarping distorted images according to one embodiment.

FIG. 3 is a flowchart of a method for aligning and unwarping distorted images according to one embodiment. Note that elements 300 and 302 may be performed in reverse order or in parallel. As indicated at 300, feature extraction and feature matching may be performed on an input set of component images to generate a set of feature points for each component image. Feature extraction and feature matching may be performed to extract features and generate point-correspondences from the extracted features for each pair of component images that overlap. As indicated at 302, an initial unwarping function, or functions, for the component images may be obtained. In one embodiment, metadata from a component image may be used to select a camera/lens profile from which lens calibration data may be read and used to automatically determine the initial unwarping function for the image. As indicated at 304, the initial unwarping function(s), which may have been determined from the calibration data in the camera/lens profile corresponding to the lens, may be applied to the coordinates of the feature points for each image to generate a set of unwarped, substantially rectilinear feature points for each image. As indicated at 306, focal lengths and image centers for the images may be estimated from the generated substantially rectilinear feature points, and pair-wise processing of the images may be performed based on the generated substantially rectilinear feature points, image centers and focal lengths to generate initial camera rotations for pairs of the component images. As indicated at 308, the estimated focal length and image center for each component image may be used to refine the initial unwarping function for the component image, thus generating a refined unwarping function for each component image. As indicated at 310, a global optimization may be performed, with the refined unwarping functions and camera rotations as input. In the global optimization, a global, nonlinear optimization technique may be applied to the refined unwarping functions and the camera rotations for the set of component images to generate optimized unwarping functions and optimized camera rotations for the component images. As indicated at 312, a composite, panoramic image may be generated from the set of component images using the optimized unwarping functions and optimized camera rotations. Generally, the output composite image may be rendered as a spherical projection of the input component images; however, other projections, such as cylindrical projections, may be generated.

As noted above, at 302, an initial unwarping function, or functions, for the component images may be obtained using metadata from the component images to select from among camera/lens profiles. Typically, all images in a set of component images are captured with the same camera, and therefore typically all images will share the same camera/lens profile and have the same initial warping function. However, it is possible that at least one component image may have been captured using a different camera/lens combination or configuration, and thus at least one component image may have a different camera/lens profile and initial unwarping function.

Figure 4:
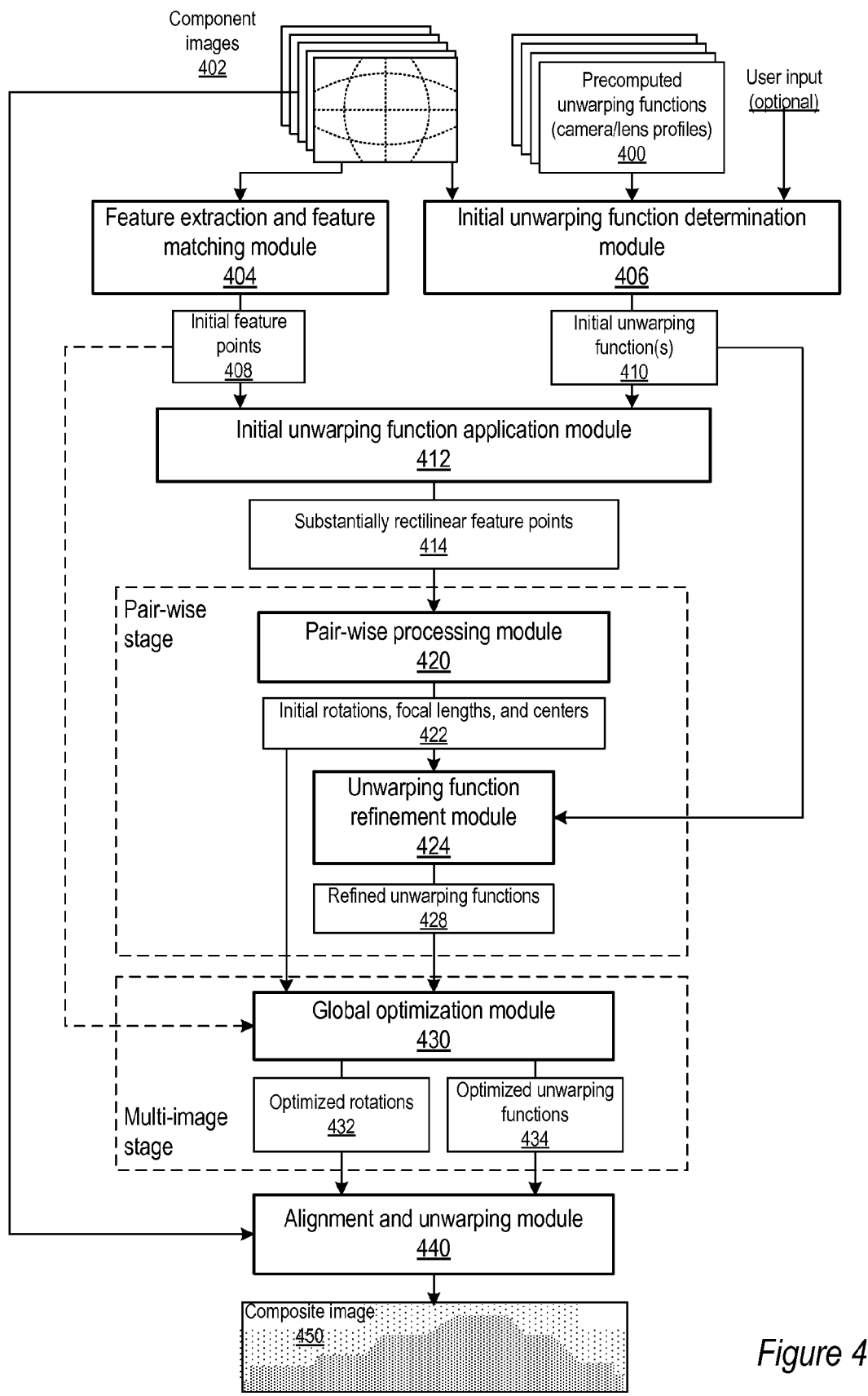
FIG. 4 is a data flow diagram of a method for aligning and unwarping distorted images according to one embodiment.

FIG. 4 is a data flow diagram of a method for aligning and unwarping distorted images according to one embodiment. A feature extraction and feature matching module 400 may receive an input set of component images 402 and generate a set of feature points for each component image. Feature extraction and feature matching may be performed by module 400 for each overlapping pair of component images to extract features and generate point-correspondences from the extracted features. Module 400 may output initial feature points 408, which includes all feature points generated by module 400 for all component images 402.

An initial unwarping function determination module 406 may obtain an initial unwarping function or functions for the component images 402. In one embodiment, module 406 may use metadata from one or more of component images 402 to select a camera/lens profile 400 from which lens calibration data may be read and used to automatically determine the initial unwarping function(s) 410 for the images. If an initial unwarping function 410 cannot be automatically determined from camera/lens profiles 400, an initial unwarping function 410 may be otherwise obtained, for example via user input.

At initial unwarping function application module 412, the initial unwarping function 410, which may have been determined from the calibration data in the camera/lens profile 400 corresponding to the lens, may be applied to the coordinates of the initial feature points 408 for each image to generate a set of unwarped, substantially rectilinear feature points 414 for each image.

At a pair-wise processing stage, pair-wise processing module 420 may estimate focal lengths and centers for the images from the generated substantially rectilinear feature points 414, and may perform pair-wise processing of the images based on the generated feature points 414 and the estimated focal lengths and centers to generate initial camera rotations for the component images. Thus, pair-wise processing module 420 may output rotations, focal lengths, and centers 422 for the images 402. An unwarping function refinement module 424 may refine the initial unwarping function 410 for each component image using the focal length and image center for the component image to generate a refined unwarping function 428 for each component image. The refined unwarping functions 428, as well as image metrics 422, may then be input to a global optimization module 422 in a multi-image stage for further optimization.

At a multi-image stage, global optimization module 430 may perform a global optimization. In one embodiment, a global, nonlinear optimization technique may be applied by module 430 to the refined unwarping functions 428 and the initial camera rotations for the set of component images 402 to generate optimized unwarping functions 432 and optimized camera rotations 434 for the component images 402.

Figure 5:
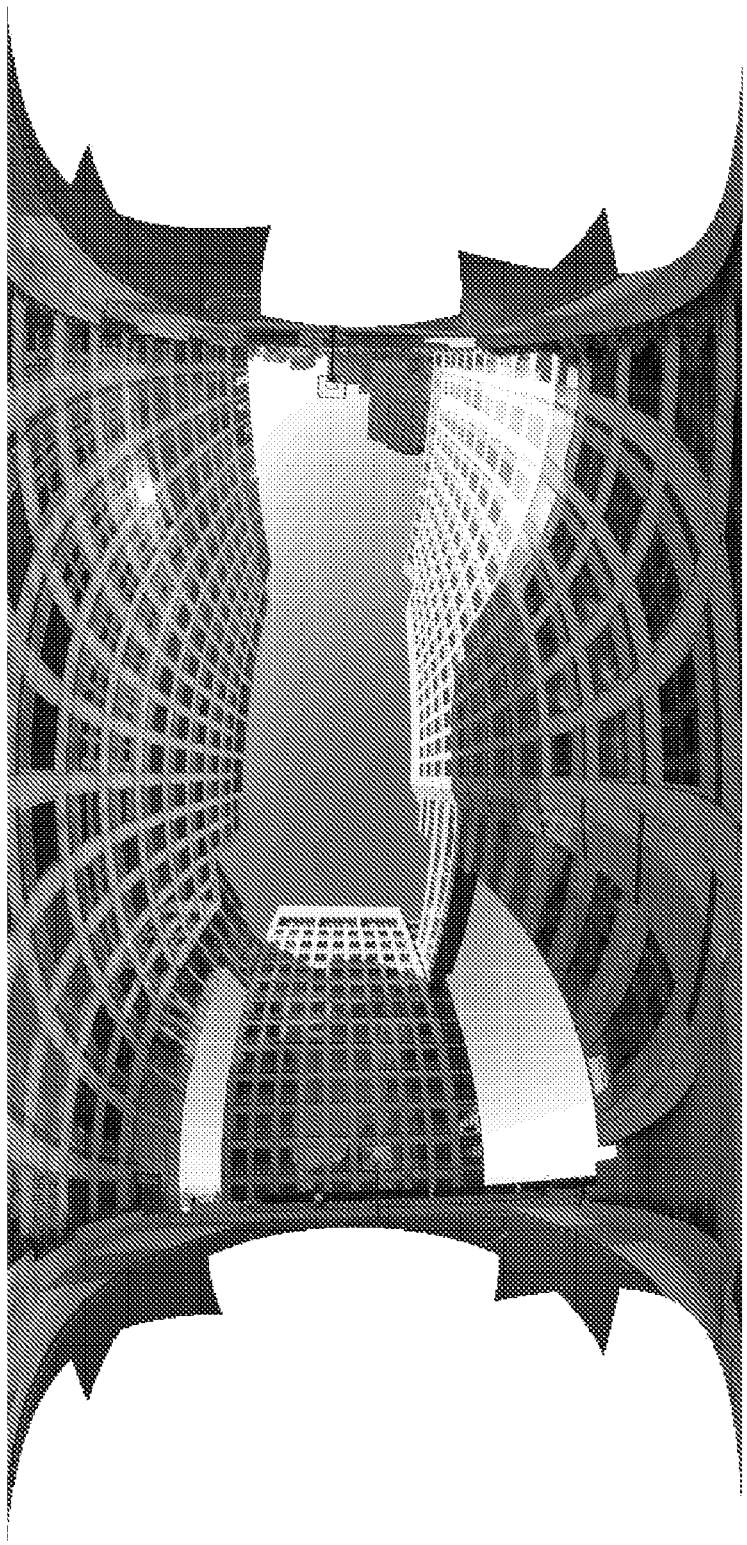
FIG. 5 shows an exemplary spherical projection that may be output by embodiments.

An alignment and unwarping module 440 may use the optimized unwarping functions 432 and optimized camera rotations 434 in generating a composite, panoramic image 450 from the set of component images 402. Generally, the output composite image 450 may be rendered as a spherical projection of the input component images 402; however, other projections, such as cylindrical projections, may be generated. The composite image 450 may be stored to a storage device. FIG. 5 shows an exemplary spherical projection that may be output by embodiments.

As described above, embodiments provide a multi-stage approach for aligning and unwarping images with excessive distortion such as the barrel distortion introduced by fisheye lenses. In one stage, a pre-computed unwarping function is applied to the coordinates of matched feature points. The pre-computed unwarping function is adaptive to the particular camera and lens combination. In another stage, pairs of images are aligned based on features points with a model that accommodates variable focal lengths, image centers and radial distortion. In yet another stage, the unwarping function and image metrics such as radial distortion may be optimized using a global nonlinear optimization technique. This multi-stage approach may provide very good alignment and unwarping results for images with excessive distortion such as images captured with fisheye lenses, and is also applicable to other types of excessive radial distortions.

By applying the unwarping function to the coordinates of the feature points and aligning the substantially rectilinear feature points produced thereby, embodiments do not need to generate intermediate images, which tends to be both memory- and computation-intense. Thus, embodiments may be much more conservative with memory, and less expensive in terms of computation, than conventional methods. By estimating both the image center and the radial distortion in the pair-wise alignment stage, error that may be introduced in the precomputed unwarping functions may be corrected. The combination of the precomputed unwarping function and the image center and radial distortion may typically be an optimal unwarping function for a particular lens and camera combination, thus producing high quality output. Furthermore, embodiments may make it easier and faster to perform the final rendering (unwarping) to generate panoramas from the input composite images.

Technical Details

Embodiments implement a multi-stage method for aligning and unwarping distorted images. A precomputed unwarping function is applied to feature points detected in the input component images to generate substantially rectilinear feature points. An alignment model is then estimated and refined at a pair-wise stage using the feature points that have been unwarped. At a multi-image stage, the alignment model may then be globally optimized using a global nonlinear optimization technique. Optionally, the input images may be stitched onto an output surface (such as a sphere or cylinder) to form a panoramic image. The pair-wise stage may account for variability that is not accounted for in the precomputed unwarping function. Embodiments do not need to generate large, compute-intensive unwarped images at an intermediate stage; the actual unwarping of the images is only performed in the last (optional step), after the alignment parameters and unwarping functions are computed and optimized.

The following is a technical description of an exemplary modeling function according to one embodiment, and describes in more detail the processing performed in the pair-wise stage and the multi-image stage to generate an optimized unwarping function and image metrics.

Equidistant fisheye lenses are used as an example. The procedure is applicable to other types of excessive radial distortions, although details may be different. For equidistance fisheye lenses, a 5-parameter polynomial model ($R_d$) may be used to relate the radial distance with the angle between the optical axis and the incoming ray. Other models may be used, for instance a 1- or 3-parameter polynomial model.

To be more precise, let $\phi$ (phi) be the angle between an incoming ray and the optical axis, and $r_d$ be the radial distance. This gives equation 1, the unwarping function, or estimated distortion model:

$$r_d = R_d(\varphi) = \sum_{i=1}^{5} p_i \varphi^i \quad (1)$$

where $[p_1, p_2, p_3, p_4, p_5]$ are the five parameters in the polynomial model ($R_d$). Given a three-dimensional (3-D) point $[X_1, X_2, X_3]$, $\phi$ can be computed as:

$$\varphi = \arctan\left(\frac{\sqrt{x_1^2 + x_2^2}}{x_3}\right)$$

The value $r_d$ can be computed as:

$$r_d = \sqrt{(x_{d1}-c_1)^2 + (x_{d2}-c_2)^2}$$

where $(c_1, c_2)$ is the center of the distortion (which is close to the center of the distorted image) and $(x_{d1}, x_{d2})$ is the distorted point location. A point $(x_{d1}, x_{d2})$ in distorted pixel units may then be related with a point $(x_{u1}, x_{u2})$ on the undistorted image plane as:

$$\begin{bmatrix} x_{d1} \\ x_{d2} \end{bmatrix} - \begin{bmatrix} c_1 \\ c_2 \end{bmatrix} \cdot \frac{\tan(\varphi(r_d))}{r_d} = \begin{bmatrix} x_{u1} \\ x_{u2} \end{bmatrix}$$

where:

$$r_d = \sqrt{(x_{d1}-c_1)^2 + (x_{d2}-c_2)^2}$$

and $\phi(r_d)$ is the inverse function of $r_d = R_d(\phi)$. A description of how this function may be computed numerically is provided later in this document.

The 5-parameter polynomial is pre-determined for a combination of a lens and a camera. This may be done by performing calibration with images of known patterns. Note that, in this step, both the polynomial parameters and $(c_1, c_2)$ may be imperfect in that they may not be exactly the same as the true values. However, they should be reasonably close to the true values. This property will be used later.

Different methods may be used in various embodiments for generating the final, optimized unwarping functions and optimized rotations. Referring to FIG. 4, one methods is to take the initial feature points (feature points 408 in FIG. 4), the initial values from pair-wise processing (element 422 of FIG. 4), and the estimated distortion model (equation (1) from above) and perform a global optimization 430 to generate optimized rotations 432 and optimized unwarping functions 434. Using this method does not necessarily generate an estimated radial distortion model. Another methods is to, instead take the substantially rectilinear feature points 414 of FIG. 4 and a simple estimated radial distortion model (see below) and perform a global optimization 430. After optimizing the radial distortion model, the optimized radial distortion model can be combined with a refined unwarping function 428 to generate optimized rotations 432 and optimized unwarping functions 434. Both methods may produce similar results, and either method may be implemented in various embodiments.

In one embodiment, alignment may be performed as follows. A model that has a radial distortion component may be estimated. For simplicity, results for two images will be shown. However, the procedure may be extended to an arbitrary number of images. Let f be the focal length for the two images, and let R be the rotation between the two images. Let $(k_1, k_2)$ be the radial distortion parameters. For simplicity, it is assumed that $(f, k_1, k_2)$ are the same for the two images. It is trivial to generalize to the case where the focal length and radial distortion parameters are different for different images. The alignment model indicates that the following relationships hold:

$$\frac{1}{f}\begin{bmatrix} x_1 \\ x_2 \end{bmatrix} = \pi\left(R \circ \begin{bmatrix} y_1/f \\ y_2/f \end{bmatrix}\right)$$

and $$\begin{bmatrix} x_{u1} \\ x_{u2} \end{bmatrix} - \begin{bmatrix} d_1 \\ d_2 \end{bmatrix} = f\begin{bmatrix} x_1 \\ x_2 \end{bmatrix}(1 + k_1 r_x^2 + k_2 r_x^4)$$

-continued $$\begin{bmatrix} y_{u1} \\ y_{u2} \end{bmatrix} - \begin{bmatrix} d_1 \\ d_2 \end{bmatrix} = f\begin{bmatrix} y_1 \\ y_2 \end{bmatrix}(1 + k_1 r_y^2 + k_2 r_y^4)$$

where:

$$r_x = \sqrt{x_1^2 + x_2^2}$$

$$r_y = \sqrt{y_1^2 + y_2^2}$$

For an arbitrary $$\begin{bmatrix} x \\ y \end{bmatrix}, \pi\left(R \circ \begin{bmatrix} x \\ y \end{bmatrix}\right)$$

is defined as:

$$\begin{bmatrix} \frac{R_{11}x + R_{12}y + R_{13}}{R_{31}x + R_{32}y + R_{33}} \\ \frac{R_{21}x + R_{22}y + R_{23}}{R_{31}x + R_{32}y + R_{33}} \end{bmatrix}$$

Note that $(d_1, d_2)$ is the image center estimated in the alignment procedure;

$$\begin{bmatrix} x_{u1} \\ x_{u2} \end{bmatrix}$$

and $$\begin{bmatrix} y_{u1} \\ y_{u2} \end{bmatrix}$$

are those points computed after applying the pre-determined unwarping functions, and may be different for different images. It will be shown that it is possible to unfold $(d_1, d_2)$ into $(c_1, c_2)$ and combine $(f, k_1, k_2)$ and the 5-parameter polynomial into a single radial model. Note that when $(x_{d1}, x_{d2})$ approaches $(c_1, c_2)$, $$\frac{\tan(\varphi(r_d))}{r_d}$$

is a constant. Let this constant be K. It is easy to show for equidistance fisheye lenses that $$\frac{\tan(\varphi(r_d))}{r_d}$$

does not vary much from K. Therefore, $(d_1, d_2)$ can be unfolded into $(c_1, c_2)$ as:

$$\begin{bmatrix} c_1 + d_1/K \\ c_2 + d_2/K \end{bmatrix}$$

This yields:

$$\begin{bmatrix} x_{d1} - c_1 - d_1/K \\ x_{d2} - c_2 - d_2/K \end{bmatrix} \frac{\tan(\varphi(r_d))}{r_d} = f \begin{bmatrix} x_1 \\ x_2 \end{bmatrix} \cdot (1 + k_1 r_x^2 + k_2 r_x^4)$$

where:

$$r_d = \sqrt{(x_{d1}-c_1-d_1/K)^2 + (x_{d2}-c_2-d_2/K)^2}$$

and where:

$$r_x = \sqrt{x_1^2 + x_2^2}$$

This leads to:

$$r_d = R_d(\arctan(f \cdot r_x(1 + k_1 r_x^2 + k_2 r_x^4)))$$

$$\begin{bmatrix} x_{d1} \\ x_{d2} \end{bmatrix} = \frac{r_d}{r_x} \begin{bmatrix} x_1 \\ x_2 \end{bmatrix} + \begin{bmatrix} c_1 + d_1/K \\ c_2 + d_2/K \end{bmatrix}$$

This means, for a given $$\begin{bmatrix} x_1 \\ x_2 \end{bmatrix}, \begin{bmatrix} x_{d1} \\ x_{d2} \end{bmatrix}$$

can be easily computed, which is important for rendering the final panoramas. Note that other rendering surfaces may be used. For example, for spherical panoramas, from $(\alpha, \beta)$, the following:

$$\begin{bmatrix} X_1 \\ X_2 \\ X_3 \end{bmatrix}$$

may be computed as:

$$\begin{bmatrix} \sin(\alpha)\cos(\beta) \\ \sin(\beta) \\ \cos(\alpha)\cos(\beta) \end{bmatrix}$$

and $$\begin{bmatrix} x_1 \\ x_2 \end{bmatrix} = \begin{bmatrix} X_1/X_3 \\ X_2/X_3 \end{bmatrix}$$

From:

$$r_d = R_d(\arctan(f \cdot r_x(1 + k_1 r_x^2 + k_2 r_x^4)))$$

it is known that $r_x$ can be also expressed as a function of $r_d$:

$$r_x = R_x(r_d) \text{ (inverse function theorem).}$$

Therefore, $$\begin{bmatrix} x_{d1} - c_1 - d_1/K \\ x_{d2} - c_2 - d_2/K \end{bmatrix} \frac{\tan(\varphi(r_d))}{r_d} \cdot \frac{1}{f} \cdot \frac{1}{(1 + k_1 R_x^2(r_d) + k_2 R_x^4(r_d))} = \begin{bmatrix} x_1 \\ x_2 \end{bmatrix}$$

Since $$\begin{bmatrix} x_1 \\ x_2 \end{bmatrix}$$

and $$\begin{bmatrix} y_1 \\ y_2 \end{bmatrix}$$

are related through:

$$\frac{1}{f} \begin{bmatrix} x_1 \\ x_2 \end{bmatrix} = \pi \left( R \circ \begin{bmatrix} y_1/f \\ y_2/f \end{bmatrix} \right)$$

it is known that:

$$\begin{bmatrix} x_{d1} - c_1 - d_1/K \\ x_{d2} - c_2 - d_2/K \end{bmatrix} \frac{\tan(\varphi(r_d))}{r_d} \cdot \frac{1}{f} \cdot \frac{1}{(1 + k_1 R_x^2(r_d) + k_2 R_x^4(r_d))}$$

is the optimal unwarping function based on the input feature correspondences. This function makes sense in that:

$$\begin{bmatrix} c_1 + d_1/K \\ c_2 + d_2/K \end{bmatrix}$$

is the new distortion center, and:

$$\arctan\left( \tan(\varphi(r_d)) \cdot \frac{1}{f} \cdot \frac{1}{(1 + k_1 R_x^2(r_d) + k_2 R_x^4(r_d))} \right)$$

is the new function for relating $r_d$ with $\phi$.

Numerical Computation $\phi(r_d)$ may need to be computed numerically for any $r_d$ in order to unwarp the feature points. For equidistance fisheye lenses, it is noted that $p_1$ dominates the whole function. Therefore, in embodiments, an iterative algorithm such as the exemplary algorithm shown below may be used to apply the unwarping operation:

$$\phi_0 = r_d/p_1$$

for (i=1: MAX_ITERATION_COUNT), do:

$$\varphi_i = \left( r_d - \sum_{j=2}^{5} p_j \varphi_{i-1}^j \right) / p_1$$

Note that K is given by $1/p_1$.

Metadata-Driven Method for Automatically Aligning Distorted Images

Images captured with extreme wide-angle lenses designed to capture large fields of views are known to be difficult for automatic image alignment algorithms due to the extreme distortion these images contain. Large distortion is typically not modeled in conventional alignment algorithms; thus, conventional automatic alignment algorithms fail if directly applied to these distorted images. In conventional automatic image alignment methods, the user has to specify whether a lens such as a fisheye lens that produces large amounts of distortion was used, and if so which particular lens was used. If the user does not do this, the distorted images will not be aligned properly. Having the user indicate the use of a wide-angle lens and specify the exact model of the lens used in capturing the distorted images may alleviate some of the problems. However, this requires the user to input additional information, which results in a tedious workflow.

Embodiments of a metadata-driven workflow for automatically aligning distorted images are described. Embodiments of the metadata-driven workflow described herein are easier to use for aligning images taken with lenses that produce large amounts of distortion than are conventional image alignment methods. In embodiments, the user does not need to specify anything for many or most cases, as the described method automatically attempts to obtain the information needed to align and unwarp distorted images based on metadata stored with the images. In embodiments, information about how the images were captured, for example the make and model of the lens and camera, may be inferred from the metadata stored with the images. This information may be used to select an appropriate camera/lens profile from among a set of predetermined camera/lens profiles. Lens calibration information in the selected camera/lens profile may then be used to align and unwarp the distorted images. Thus, the user may not need to specify detailed information regarding the cameras and lenses used to capture distorted images. Embodiments may also allow the user to specify custom camera/lens profiles, for example when metadata are not available or a predetermined camera/lens profile is not available. In one embodiment, the user may provide a custom lens profile if necessary or desired.

Most digital cameras store metadata with captured images. Digital image metadata formats may include, but are not limited to, Exchangeable Image File Format (EXIF); IPTC, a standard developed by the International Press Telecommunications Council; and Extensible Metadata Platform (XMP) developed by Adobe™. The metadata for the component images may be accessed to determine, for example, what particular lens and/or camera the images were taken with. In embodiments, this information obtained from the image metadata may then be used to look up a camera/lens profile for the make/model of lens that was used to capture the component images in a file, database, table, or directory of camera/lens profiles. The calibration data stored in the camera/lens profiles may, for example, have been previously generated by calibrating examples of the respective lenses and cameras.

Figure 6A:
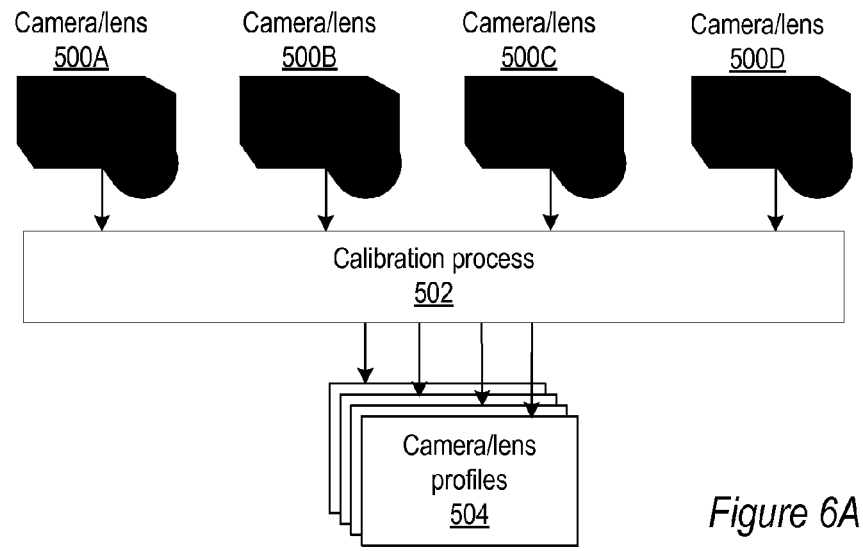
FIGS. 6A and 6B illustrate a metadata-driven workflow for automatically aligning distorted images according to one embodiment.
Figure 6B:
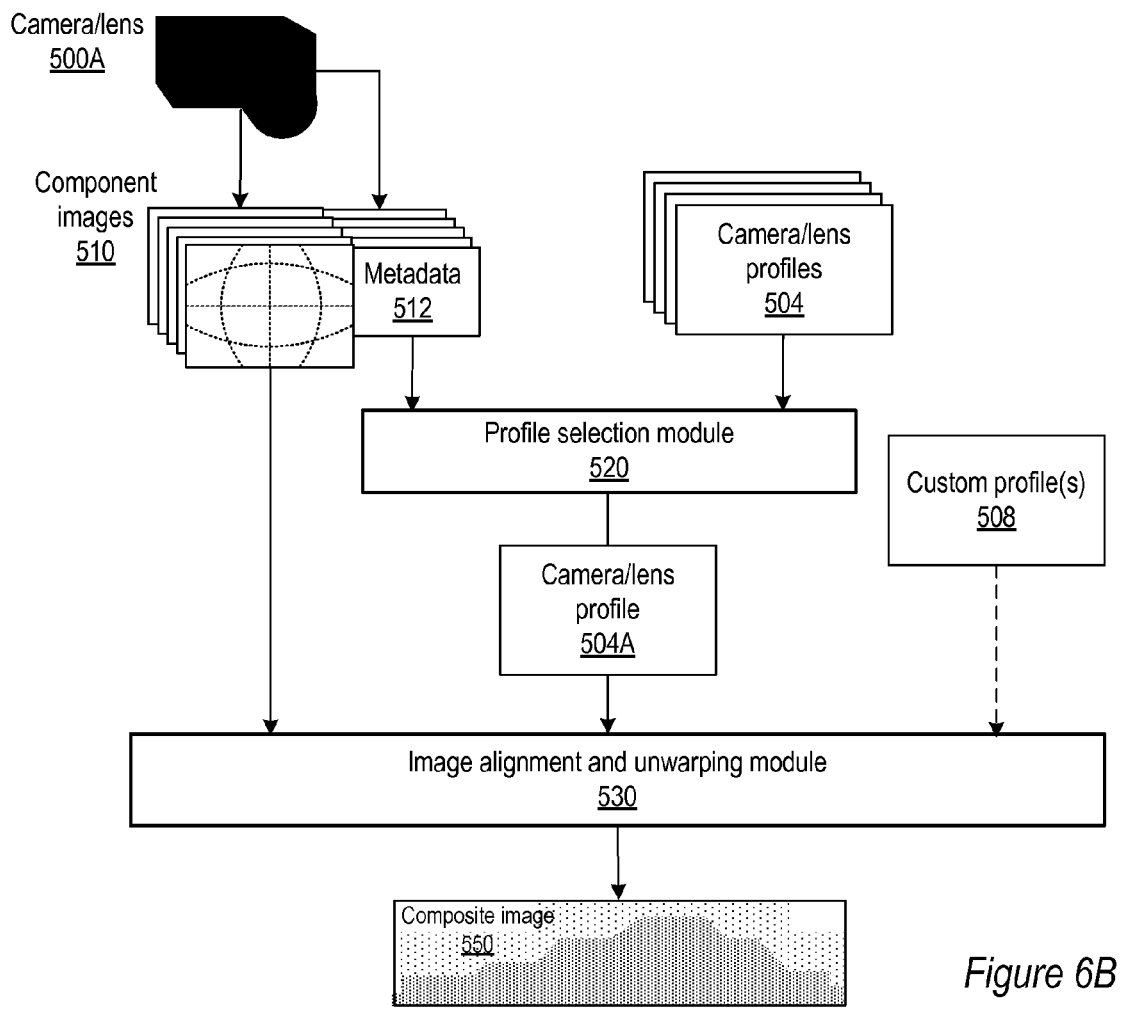

FIGS. 6A and 6B illustrate a metadata-driven workflow for automatically aligning distorted images according to one embodiment. FIG. 6A illustrates an offline, preliminary stage in which different camera/lens combinations 500 are calibrated via a calibration process 502 to generate camera/lens profiles 504. In one embodiment, calibration rigs and other software and hardware tools may be used in calibration process 502.

In some embodiments, the calibration data (or lens profiles) may be formatted and stored according to a markup language in a markup language file or files (camera/lens profiles 504). An exemplary markup language that may be used in one embodiment is eXtensible Markup Language (XML). Other markup languages or other data/file formats may be used in other embodiments.

FIG. 7 shows an exemplary camera/lens profile 504 for a single camera/lens in XML format, according to one embodiment. In one embodiment, there may be two categories of properties defined in each camera/lens profile 504. A first set of properties may be used in matching the camera/lens profile against the metadata read from the input image. In one embodiment, all but one of these matching properties may be omitted from the description, and at least some of these properties may also have empty values. In both cases, the omitted properties would not be used to match against the profiles. The matching properties may include one or more of, but are not limited to:

Camera:Make—The camera manufacturer
Camera:Model—The model name of the camera
Camera:SerialNumber—The serial number of the camera
Camera:Lens—A description of the lens
Camera:LensInfo—Min/Max focal length and aperture combination(s)
Camera:ImageWidth—The image width
Camera:ImageLength—The image height
Camera:ApertureValue—The lens aperture
Camera:Fnumber—The F number The second set of properties define the actual camera/lens profile data that are meaningful to the lens correction model being used, for example an implementation of the method for aligning and unwarping distorted images described herein. Some of the properties may be optional. However, when the properties are present, the properties can be used to override constants/defaults or internally calculated values. The second set of properties may include one or more of, but are not limited to:

Camera: SensorFormatFactor—The format factor/crop factor/focal length multiplier of the image sensor with respect to the 35 mm film. In one embodiment, optional.
Camera:ImageXCenter—The optical image center in the width (X) direction, normalized by the image width. In one embodiment, optional. In one embodiment, default 0.5.
Camera:ImageYCenter—The optical image center in the height (Y) direction, normalized by the image height. Float. In one embodiment, optional. In one embodiment, default 0.5.
Camera:LensPrettyName—Pretty lens name (make and model). String. In one embodiment, optional but recommended.
Camera:FishEyeLens—True if the lens is a fisheye lens. Boolean. In one embodiment, optional.
Camera:FishEyeModelParams—List of fisheye lens calibration parameters. In one embodiment, required if the lens is a fisheye lens.

A comprehensive set of camera/lens profiles 504 generated by calibration process 502 may be provided with various digital imaging products such as Adobe™ Photoshop™ or Adobe™ Camera RAW™ plug-in for Photoshop™, or may be provided to consumers via other channels or methods. For example, a website may be provided from which camera/lens profiles 504 may be downloaded, or a camera/lens manufacturer may provide camera/lens profiles for their cameras/lenses with the camera/lens or via a website. In one embodiment, a software program or plug-in module for calibrating camera/lens combinations may be provided to consumers so that end users may calibrate their own lenses.

FIG. 6B illustrates a metadata-driven workflow method for automatically aligning distorted images according to one embodiment. A user captures a set of component images 510 with a camera/lens 500A. Note that the set of component images 510 may include one or more images. The camera stores metadata 512 with the image(s) 510. The set of component images 510 may be loaded into a digital imaging system that implements the metadata-driven workflow method for automatic alignment. A profile selection module 520 compares the metadata 512 to camera/lens profiles 504 to determine if any of the images 510 were taken with a known lens. If so, then the image(s) 510 may be automatically aligned and unwarped by image alignment and unwarping module 530 using the lens profile information from the corresponding camera/lens profile 504. In this example, camera/lens profile 504A was identified as matching the metadata 512, and so the lens profile information from that camera/lens profile will be used by image alignment and unwarping module 530.

In one embodiment, image alignment and unwarping module 530 may implement an embodiment of the method for aligning and unwarping distorted images as described herein. In embodiments of this method, the feature points detected on the image or images may be unwarped to their substantially rectilinear versions using a precomputed unwarping function obtained from the lens profile information stored in a camera/lens profile 504 matching the image metadata 512. The method does not directly unwarp the image(s), but instead only unwarps the feature points. This avoids the problem found in conventional methods of creating very large intermediate images. In addition, the unwarping function may be based on a combination of the lens profile and the camera used to capture the images. In other words, while the profile for a lens A may be established via a process as described in FIG. 6A using a camera B, the unwarping function for lens A may be used on images taken with lens A and camera C. In other words, embodiments may adjust the unwarping function automatically based on the camera/lens combination information from camera/lens profiles 504.

Once the feature points are unwarped into substantially rectilinear feature points, the images 510 may be aligned by image alignment and unwarping module 530 as if they were taken with regular rectilinear lenses. For an exemplary method of aligning the images, see the embodiments of the method for aligning and unwarping distorted images as described elsewhere herein.

Once alignment is computed and a composition canvas is chosen (typically, but not necessarily, spherical), the images may be unwarped by image alignment and unwarping module 530 to create the final composition (e.g., composite image 550) by combining the lens profile, camera information and alignment parameters. Such a combination is similar to what may be done as described above where the lens profile is adapted to the particular camera used in capturing the images 510. If images 510 include a large amount of distortion, a spherical projection will typically be used. In one embodiment, the choice of what projection model to use may be made automatically made based on the metadata 512 read from the images. The composite image 550 may be stored to a storage device. FIG. 5 shows an exemplary spherical projection that may be output by embodiments.

It is possible that the metadata 512 may not be sufficient for detecting images with large distortion, for example images captured with a fisheye lens. For example, there are fisheye converters which are purely mechanical and do not carry any electronic data. Therefore, the metadata 512 captured in the image may not include information to identify images 510 as being captured via such a converter. Thus, one embodiment may provide a user interface that allows the user to override the default behavior and to identify a custom camera/lens profile 508, as shown in FIG. 6B. Image alignment and unwarping module 530 then processes the images 510 as described above using the custom profile 508 instead of a profile 504 identified from image metadata 512.

It is possible that a set of component images 510 may not include metadata 512, or that the metadata 512 may not sufficiently specify the camera/lens combination 500. Therefore, one embodiment may provide one or more user interface elements whereby the user may select a camera/lens profile 504 that best matches the camera/lens 500 used to capture component images 510 that are to be processed. It is also possible that there may not be an existing camera/lens profile 504 corresponding to the lens used to capture the component images. In one embodiment, the user may use the user interface elements to select an existing camera/lens profile 504 that most closely matches the actual camera/lens 500 used to capture the component images. Alternatively, the method may be configured to attempt to automatically determine an existing camera/lens profile 504 that most closely matches the actual camera/lens 500 used to capture the component images. If a close match is found, then that best-matching camera/lens profile 504 may be used. If not, then the user may be asked to select a camera/lens profile 504, or to create a new camera/lens profile 504, or to otherwise obtain an appropriate camera/lens profile 504, for example by downloading one via the Internet.

One embodiment may provide one or more user interface elements whereby a user may enter appropriate information to generate a new camera/lens profile 508 for the lens. One embodiment may provide user interface elements and a software module via which the user may perform a calibration of the user's camera/lens and thus generate a new camera/lens profile 508 for the lens. Note that the calibration data stored in the camera/lens profiles 504 may have been previously generated by physically calibrating examples of the respective lenses and cameras "at the factory." Individual lenses of the same make and model may have small differences. The above-mentioned user interface elements and software module may thus be used to replace or modify a default or factory camera/lens profile 504 for a make/model of lens to thus create a new profile specific to the particular camera/lens of the same make/model used by the photographer, if so desired.

Other Applications of Image Metadata

The above generally describes using metadata from captured images to drive an automated workflow process for unwarping images with excessive amounts of distortion, such as images captured with fisheye lenses. The automated workflow process generally involves determining a precalculated unwarping function from the metadata. However, image metadata may be applied in different ways and for different purposes.

For example, image metadata may be used to automatically determine if and when an image processing application, system or automated workflow needs to invoke lens distortion estimation. This is more or less independent of the workflow process described above. In this method, the metadata may be used to detect if an image was captured using a lens that introduces distortion. If such a lens is detected, the method may optionally invoke a distortion estimation function that estimates lens distortion directly from the images. The distortion may be simple radial distortion or more complicated distortion, such as extreme distortion introduced by a fisheye lens. This information may be determined from the metadata, for example from a lens type indicated in the metadata. In the case of a lens that introduces excessive amounts of distortion, the method may determine a lens profile for the lens from a set of precomputed lens profiles, similar to the above-described metadata-driven workflow process implementation. In the case of a lens that introduces simple radial distortion, the method may either determine and load a lens profile or simply estimate the amount of distortion directly from the images.

Optionally, the user may be informed via a user interface that the lens distortion estimation has been invoked. Variations on this method are possible.

As another example of a different use for image metadata is in a method to automatically set tuning parameters for an image alignment algorithm. For example, for some types of images, the image centers may be reliably estimated, while for other types of images, it may not be easy or even possible to reliably estimate the image centers. Therefore, image metadata may be used to detect whether an image or set of image is of a type for which the image centers can be reliably estimated. If they are, then an image center detection module may be called. If not, some other method of determining or estimating image centers may be invoked. As another example, the image metadata may be used to detect if a set of component images were captured using a fisheye lens and, if so, the output mode for the images may be automatically set to generate a spherical rendering of the images.

As another example of possible used for image metadata, for fisheye images, since the unwarping function is not perfect and generates substantially, but not truly, rectilinear coordinates from the initial feature points, it may be desirable to tolerate more error in the pair-wise processing step. Thus, if it is detected that the images are fisheye images, parameters of the pair-wise processing module may be adjusted to account for the fact that pair-wise processing of fisheye images is to be performed. Similarly, parameters of the pair-wise processing module or of other modules may be adjusted according to lens, camera, or other information from the image metadata, and/or one or more modules or processing steps may be performed or skipped depending upon information from the image metadata.

Module Implementations

Figure 8:
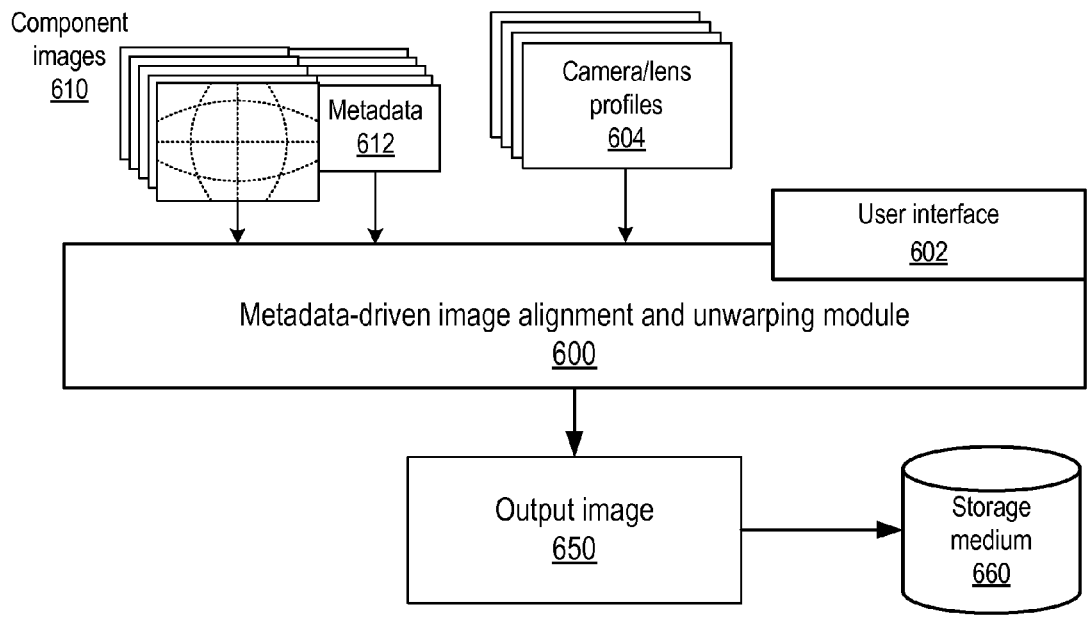
FIG. 8 illustrates a metadata-driven image alignment and unwarping process as a module, and shows the input and output to the module, according to one embodiment.

FIG. 8 illustrates the metadata-driven image alignment and unwarping process as a module, and shows the input and output to the module, according to one embodiment. Metadata-driven image alignment and unwarping module 600 receives as input a set of composite images 610 and the metadata 612 for the images, and precomputed camera/lens profiles 604. Metadata-driven image alignment and unwarping module 600 generates an output image 650, for example a spherical projection of input images 610. Output image 650 may, for example, be stored to a storage medium 660, such as system memory, a disk drive, DVD, CD, etc.

One embodiment may provide a user interface 602 that provides one or more user interface elements that enable the user to, for example, specify input images 610 and specify a format or other information or instructions for the output image 650. In one embodiment, user interface 602 may allow a user to override the default behavior by identifying a custom camera/lens profile, for example when metadata 612 is unavailable or inadequately identifies the camera/lens combination.

Figure 9:
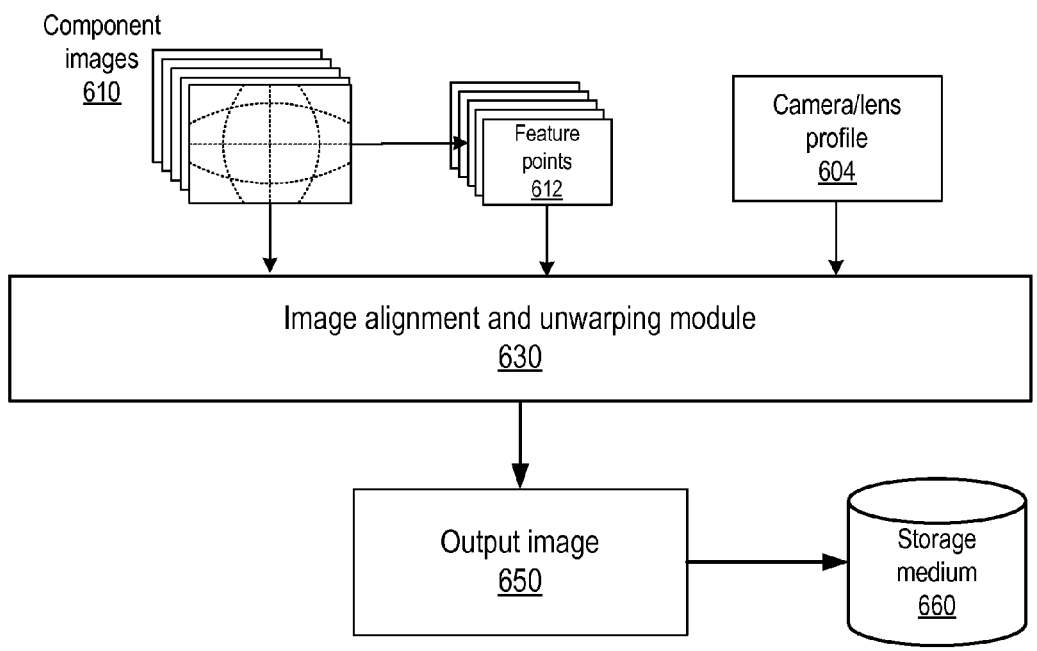
FIG. 9 illustrates an image alignment and unwarping method as a module, and shows the input and output to the module, according to one embodiment.

FIG. 9 illustrates the image alignment and unwarping method as a module, and shows the input and output to the module, according to one embodiment. Image alignment and unwarping module 630 receives as input a set of composite images 610, computed feature points 612 for the images 610, and a precomputed camera/lens profile 604 for the images 610. Image alignment and unwarping module 630 generates an output image 650, for example a spherical projection of input images 610. Output image 650 may, for example, be stored to a storage medium 660, such as system memory, a disk drive, DVD, CD, etc.

It is to be noted that an embodiment of the image alignment and unwarping module 630 as described herein may be implemented in an embodiment of metadata-driven image alignment and unwarping module 600 to perform the function of aligning and unwarping distorted images. However, metadata-driven image alignment and unwarping module 600 may be used with other implementations of an image alignment and unwarping process.

Exemplary System

Figure 10:
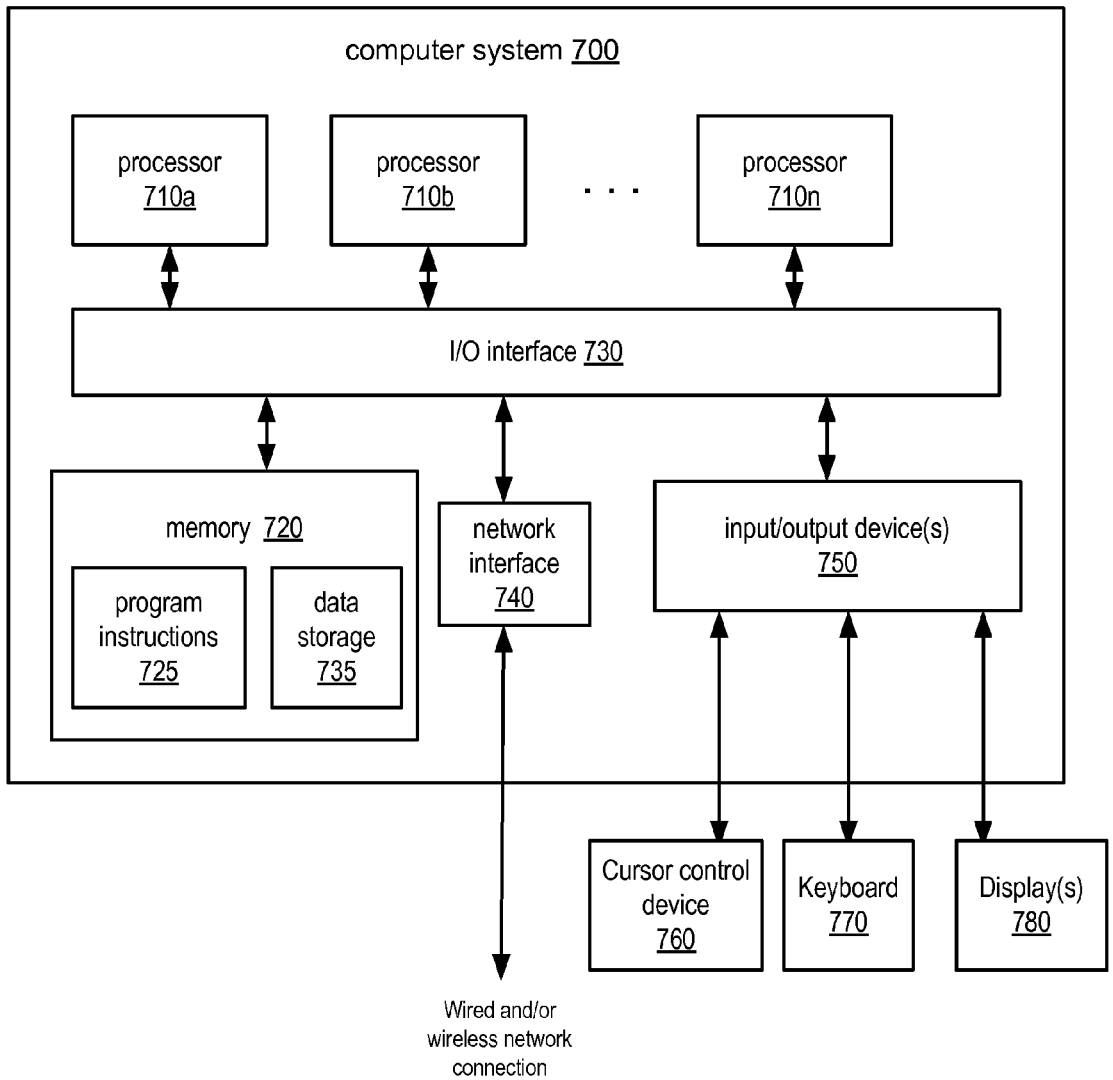
FIG. 10 illustrates an exemplary computer system that may be used in embodiments.

Various components of embodiments of a metadata-driven image alignment and unwarping module and/or an image alignment and unwarping module may be executed on one or more computer systems, which may interact with various other devices. One such computer system is illustrated by FIG. 10. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a metadata-driven image alignment and unwarping module and/or an image alignment and unwarping module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, configured to implement embodiments of a metadata-driven image alignment and unwarping module and/or an image alignment and unwarping module as described herein, and data storage 735, comprising various data accessible by program instructions 725. In one embodiment, program instructions 725 may include software elements of a metadata-driven image alignment and unwarping module and/or an image alignment and unwarping module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a metadata-driven image alignment and unwarping module and/or an image alignment and unwarping module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
applying an initial unwarping function to coordinates of each feature point in a set of feature points extracted from a set of distorted component images to generate a set of substantially rectilinear feature points for the set of component images;
estimating focal lengths and initial camera rotations for each of the component images according to the substantially rectilinear feature points;
refining the initial unwarping function according to the estimated focal lengths for the component images to generate refined unwarping functions for the component images; and applying a global nonlinear optimization technique to the refined unwarping functions and the initial camera rotations to generate globally optimized unwarping functions and globally optimized camera rotations for the component images.

2. The computer-implemented method as recited in claim 1, further comprising applying the optimized unwarping functions and optimized camera rotations to the set of component images to align and unwarp the component images.

3. The computer-implemented method as recited in claim 2, further comprising rendering a composite image from the aligned and unwarped component images.

4. The computer-implemented method as recited in claim 3, wherein the composite image is a spherical projection of the component images.

5. The computer-implemented method as recited in claim 1, further comprising:
calibrating a particular lens to generate a precalculated unwarping function; and
selecting the precalculated unwarping function as the initial unwarping function.

6. The computer-implemented method as recited in claim 5, wherein the set of distorted component images were captured using a lens of the same type as the particular lens that was calibrated to generate the precalculated unwarping function.

7. The computer-implemented method as recited in claim 1, further comprising selecting the initial unwarping function from among a plurality of precalculated unwarping functions according to a particular camera and lens combination that was used to capture the set of distorted component images.

8. The computer-implemented method as recited in claim 1, wherein the set of distorted component images were captured using a fisheye lens.

9. The computer-implemented method as recited in claim 1, further comprising extracting the set of feature points from the component images in accordance with a feature extraction and feature matching process that determines feature points and feature point correspondences between overlapping pairs of images.

10. The computer-implemented method as recited in claim 1, wherein said estimating focal lengths and initial camera rotations for each of the component images according to the substantially rectilinear feature points comprises performing pair-wise processing of the component images according to the substantially rectilinear feature points and image centers of the component images to estimate the focal lengths and to estimate the initial camera rotations.

11. A system, comprising:
at least one processor; and
a memory comprising program instructions, wherein the program instructions are executable by the at least one processor to:
apply an initial unwarping function to the coordinates of each feature point in a set of feature points extracted from a set of distorted component images to generate a set of substantially rectilinear feature points for the set of component images;
estimate focal lengths and initial camera rotations for each of the component images according to the substantially rectilinear feature points;
refine the initial unwarping function according to the estimated focal lengths for the component images to generate refined unwarping functions for the component images; and
apply a global nonlinear optimization technique to the refined unwarping functions and the initial camera rotations to generate globally optimized unwarping functions and globally optimized camera rotations for the component images.

12. The system as recited in claim 11, wherein the program instructions are executable by the at least one processor to apply the optimized unwarping functions and optimized camera rotations to the set of component images to align and unwarp the component images.

13. The system as recited in claim 12, wherein the program instructions are executable by the at least one processor to:
render a composite image from the aligned and unwarped component images; and
store the composite image to a storage device coupled to the system.

14. The system as recited in claim 13, wherein the composite image is a spherical projection of the component images.

15. The system as recited in claim 11, wherein the program instructions are executable by the at least one processor to select a precalculated unwarping function stored on a storage device coupled to the system as the initial unwarping function, wherein the precalculated unwarping function was generated by a calibration process applied to a particular lens.

16. The system as recited in claim 15, wherein the set of distorted component images were captured using a lens of the same type as the particular lens that was calibrated to generate the precalculated unwarping function.

17. The system as recited in claim 11, wherein the program instructions are executable by the at least one processor to select the initial unwarping function from among a plurality of precalculated unwarping functions stored on a storage device coupled to the system according to a particular camera and lens combination that was used to capture the set of distorted component images.

18. The system as recited in claim 11, wherein the set of distorted component images were captured using a fisheye lens.

19. The system as recited in claim 11, wherein the program instructions are executable by the at least one processor to extract the set of feature points from the component images in accordance with a feature extraction and feature matching process that determines feature points and feature point correspondences between overlapping pairs of images.

20. The system as recited in claim 11, wherein, to estimate focal lengths and initial camera rotations for each of the component images according to the substantially rectilinear feature points, the program instructions are executable by the at least one processor to perform pair-wise processing of the component images according to the substantially rectilinear feature points and image centers of the component images to estimate the focal lengths and to estimate the initial camera rotations.

21. A non-transitory computer-readable storage medium storing program instructions, wherein the program instructions are computer-executable to implement:
applying an initial unwarping function to the coordinates of each feature point in a set of feature points extracted from a set of distorted component images to generate a set of substantially rectilinear feature points for the set of component images;
estimating focal lengths and initial camera rotations for each of the component images according to the substantially rectilinear feature points;
refining the initial unwarping function according to the estimated focal lengths for the component images to generate refined unwarping functions for the component images; and applying a global nonlinear optimization technique to the refined unwarping functions and the initial camera rotations to generate globally optimized unwarping functions and globally optimized camera rotations for the component images.

22. The non-transitory computer-readable storage medium as recited in claim 21, wherein the program instructions are computer-executable to implement applying the optimized unwarping functions and optimized camera rotations to the set of component images to align and unwarp the component images.

23. The non-transitory computer-readable storage medium as recited in claim 22, wherein the program instructions are computer-executable to implement rendering a composite image from the aligned and unwarped component images.

24. The non-transitory computer-readable storage medium as recited in claim 23, wherein the composite image is a spherical projection of the component images.

25. The non-transitory computer-readable storage medium as recited in claim 21, wherein the program instructions are computer-executable to implement selecting a precalculated unwarping function as the initial unwarping function, wherein the precalculated unwarping function was generated by a calibration process applied to a particular lens.

26. The non-transitory computer-readable storage medium as recited in claim 25, wherein the set of distorted component images were captured using a lens of the same type as the particular lens that was calibrated to generate the precalculated unwarping function.

27. The non-transitory computer-readable storage medium as recited in claim 21, wherein the program instructions are computer-executable to implement selecting the initial unwarping function from among a plurality of precalculated unwarping functions according to a particular camera and lens combination that was used to capture the set of distorted component images.

28. The non-transitory computer-readable storage medium as recited in claim 21, wherein the set of distorted component images were captured using a fisheye lens.

29. The non-transitory computer-readable storage medium as recited in claim 21, wherein the program instructions are computer-executable to implement extracting the set of feature points from the component images in accordance with a feature extraction and feature matching process that determines feature points and feature point correspondences between overlapping pairs of images.

30. The non-transitory computer-readable storage medium as recited in claim 21, wherein, in said estimating focal lengths and initial camera rotations for each of the component images according to the substantially rectilinear feature points, the program instructions are computer-executable to implement performing pair-wise processing of the component images according to the substantially rectilinear feature points and image centers of the component images to estimate the focal lengths and to estimate the initial camera rotations for each of the component images.

* * * * *